United States Patent
Grobelny et al.

(10) Patent No.: US 10,739,843 B2
(45) Date of Patent: Aug. 11, 2020

(54) SYSTEM AND METHOD OF MONITORING DEVICE STATES

(71) Applicant: Dell Products L.P., Round Rock, TX (US)

(72) Inventors: Nicholas D. Grobelny, Austin, TX (US); James T. Gillon, Round Rock, TX (US); Christian L. Critz, Liberty Hill, TX (US)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 15/901,434

(22) Filed: Feb. 21, 2018

(65) Prior Publication Data

US 2019/0258309 A1    Aug. 22, 2019

(51) Int. Cl.
| | | |
|---|---|---|
| *G06F 1/3296* | (2019.01) | |
| *G06F 11/30* | (2006.01) | |
| *G06F 11/34* | (2006.01) | |
| *G06F 13/40* | (2006.01) | |

(52) U.S. Cl.
CPC ........ *G06F 1/3296* (2013.01); *G06F 11/3041* (2013.01); *G06F 11/3055* (2013.01); *G06F 11/3058* (2013.01); *G06F 11/349* (2013.01); *G06F 11/3476* (2013.01); *G06F 13/4068* (2013.01); *G06F 2213/0016* (2013.01);
(Continued)

(58) Field of Classification Search
CPC .............. G06F 1/3296; G06F 11/3041; G06F 11/3055; G06F 11/3058; G06F 11/3476; G06F 11/349; G06F 13/4068; G06F 2213/0016; G06F 2213/0024; G06F 2213/0026; G06F 2213/0042

USPC .......... 714/47.1, 55, 57; 713/300, 323, 100, 713/340; 707/609, 624
See application file for complete search history.

(56) References Cited

U.S. PATENT DOCUMENTS 6,460,151 B1 * 10/2002 Warwick ............... G06F 11/008
714/57
8,375,258 B1 * 2/2013 Sheets ................. G06F 11/0721
714/55
(Continued)

OTHER PUBLICATIONS

Modern Standby SleepStudy, May 1, 2017, Microsoft Docs (Year: 2017).*
(Continued)

*Primary Examiner* — Aurel Prifti
(74) *Attorney, Agent, or Firm* — Baker Botts L.L.P.

(57) ABSTRACT

In one or more embodiments, one or more systems, methods, and/or processes may provide low power state entry signals to multiple devices of an information handling system. After providing the low power state entry signals to the multiple devices, the one or more systems, methods, and/or processes may receive a first status signal from a first device of the multiple devices within an amount of time; may determine that the first status signal from the first device was received within the amount of time; may determine that a second status signal from a second device of the multiple devices was not received within the amount of time; may log that the first status signal from the first device was received within the amount of time; and may log that the second status signal from the second device was not received within the amount of time.

19 Claims, 9 Drawing Sheets

(52) U.S. Cl.
CPC .............. *G06F 2213/0024* (2013.01); *G06F 2213/0026* (2013.01); *G06F 2213/0042* (2013.01)

(56) References Cited

U.S. PATENT DOCUMENTS

| | | | | |
|---|---|---|---|---|
| 8,775,704 | B2* | 7/2014 | Frid | G06F 13/4282 710/100 |
| 9,417,679 | B2* | 8/2016 | Sadowski | G06F 1/3212 |
| 2007/0067754 | A1* | 3/2007 | Chen | G06F 11/0709 717/127 |
| 2007/0220375 | A1* | 9/2007 | Baz | G06F 11/0715 714/55 |
| 2008/0002509 | A1* | 1/2008 | You | G06F 1/26 365/230.05 |
| 2009/0063877 | A1* | 3/2009 | Lewis | G06F 1/266 713/310 |
| 2010/0100752 | A1* | 4/2010 | Chueh | G06F 1/3203 713/320 |
| 2010/0235654 | A1* | 9/2010 | Malik | G06F 1/3209 713/300 |
| 2011/0296251 | A1* | 12/2011 | Joy | G06F 11/0715 714/47.1 |
| 2012/0246506 | A1* | 9/2012 | Knight | G06F 1/3206 713/340 |
| 2014/0122421 | A1* | 5/2014 | Furukoshi | G06F 11/0757 707/609 |
| 2014/0229706 | A1* | 8/2014 | Kuesel | G06F 15/76 712/31 |
| 2015/0058676 | A1* | 2/2015 | Boger | G06F 9/542 714/39 |
| 2015/0058974 | A1* | 2/2015 | Terashita | G06F 9/54 726/19 |
| 2015/0220131 | A1* | 8/2015 | Johansson | G06F 1/3215 713/323 |
| 2016/0055225 | A1* | 2/2016 | Xu | G06F 16/27 707/624 |
| 2016/0147545 | A1* | 5/2016 | Jain | G06F 9/44505 713/100 |
| 2016/0179166 | A1* | 6/2016 | Kurts | G06F 1/3206 713/323 |
| 2017/0168914 | A1* | 6/2017 | Altman | G06F 11/3495 |
| 2017/0177065 | A1* | 6/2017 | Rajwan | G06F 1/3296 |
| 2017/0371402 | A1* | 12/2017 | Cooper | G05B 15/02 |
| 2018/0336960 | A1* | 11/2018 | Chu | G06F 11/3034 |
| 2019/0087295 | A1* | 3/2019 | Sultenfuss | G06F 11/2733 |
| 2019/0303341 | A1* | 10/2019 | Deng | H04L 12/40013 |
| 2019/0332154 | A1* | 10/2019 | Thompson | G06F 1/24 |

OTHER PUBLICATIONS

Microsoft Docs, Modern standby SleepStudy, at << https://docs.microsoft.com/en-us/windows-hardware/design/device-experiences/modern-standby-sleepstudy?WT.mc_id=email>> 1 page, May 2, 2017.

* cited by examiner

SYSTEM AND METHOD OF MONITORING DEVICE STATES

BACKGROUND

Field of the Disclosure

This disclosure relates generally to information handling systems and more particularly to monitoring devices associated with an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may provide low power state entry signals to multiple devices of an information handling system. For example, an operating system, executing on the information handling system, may provide the low power state entry signals to the multiple devices. In one or more embodiments, after providing the low power state entry signals to the multiple devices, an embedded controller of the information handling system may receive a first status signal from a first device of the plurality of devices within an amount of time. The embedded controller may further determine that the first status signal from the first device was received within the amount of time and may determine that a second status signal from a second device of the multiple devices was not received within the amount of time. In one or more embodiments, the embedded controller may further log that the first status signal from the first device was received within the amount of time and may log that the second status signal from the second device was not received within the amount of time.

In one or more embodiments, the embedded controller may further provide a message to the operating system that indicates that the second device did not comply with a respective low power state entry signal of the low power state entry signals. For example, the embedded controller may provide the message to the operating system via at least one of a Windows Management Interface (WMI) and a Common Information Model (CIM). In one or more embodiments, the operating system may provide the message to an application. In one example, the application may provide the message to a developer and/or an administrator, which may utilize information, from the application, that indicates that the device did not transition to the powered down state. For instance, the developer and/or the administrator may utilize the information that indicates that the device did not transition to the powered down state to debug what may be preventing an information handling system and/or a device from entering a sleep mode. In another example, the application may provide the message to a storage device. In one or more embodiments, the one or more systems, methods, and/or processes may further provide a wake-up signal to the multiple devices of the information handling system. After providing the wake-up signals to the multiple devices, the embedded controller may further determine that a third status signal from a third device of the plurality of devices was not received within the another amount of time and may log that the third status signal from the third device was not received within the amount of time.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
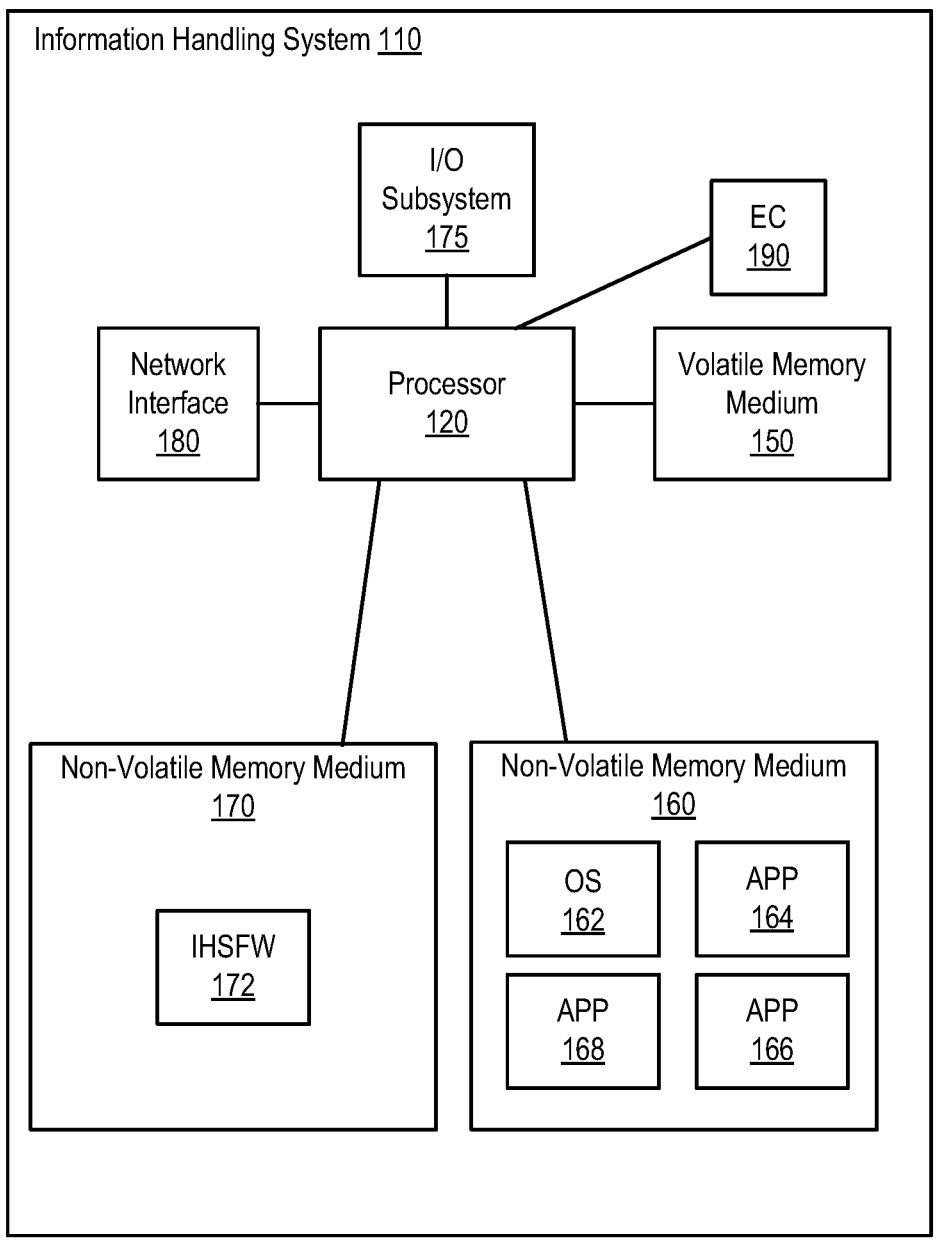
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may utilize multiple power states. In one example, in a first power utilization state (e.g., "S0"), the information handling system may be fully usable. For instance, one or more hardware components that may not be in use may conserve power by entering a lower power state. In a second example, in a second power utilization state (e.g., "S0 low-power idle", "Sleep/Modern Standby", etc.), the information handling system may switch from a low-power state to full-power state. For instance, the information handling system may respond to hardware events and/or network events. In a third example, in a third power utilization state (e.g., "Sleep", "S1", "S2", "S3", etc.), the information handling system may appear (to a person) that the information handling system is powered off. For instance, volatile memory may be refreshed to maintain an information handling system state, which one or more components may remain powered so the information handling system may wake from input from one or more of a keyboard, a network, and a USB device, among others. In a fourth example, in a fourth power utilization state (e.g., "Hibernate", "S4", etc.), power consumption may be reduced to a lowest level. For instance, the information handling system may store contents of a volatile memory to a hibernation file to preserve information handling system state. One or more components may remain powered so the information handling system may wake from input from one or more of a keyboard, a network, and a USB device, among others. In a fifth example, in a fifth power utilization state (e.g., "Soft Off", "S5", etc.), the information handling system may be in a shutdown and/or boot cycle. In another example, in a sixth power utilization state (e.g., "Mechanical Off", "G3", etc.), the information handling system may be completely off and/or may not consume power. For instance, the information handling system may return to a working state after a full reboot.

In one or more embodiments, information associated with devices of an information handling system may be determined. For example, the information may include whether or not a device has entered a sleep state. For instance, the sleep state may be or include a deepest runtime idle platform state (e.g., "modern standby"). In one or more embodiments, the device may be issued an instruction that indicates a transition to a powered down state to conserve power. For example, the powered down state may be or include a runtime D3 (RTD3) state. In one or more embodiments, the device may signal that the device is to transition to the powered down state. In one example, the device may provide a signal to an embedded controller of the information handling system, which may indicate that the device is to transition to the powered down state. In another example, the device may provide a signal to a platform controller hub of the information handling system, which may indicate that the device is to transition to the powered down state. In one instance, the platform controller hub may provide the signal from the device to the embedded controller. In another instance, the platform controller hub may provide another signal to the embedded controller, which may indicate that the device is to transition to the powered down state.

In one or more embodiments, a device may receive the instruction that indicates the transition to the powered down state and may not provide the signal to indicate that the device is to transition to the powered down state. For example, after an amount of time without receiving the signal to indicate that the device is to transition to the powered down state, the device may be flagged as failing to participate. In one instance, information may be logged and/or stored, which may indicate that the device did not transition to the powered down state. In another instance, flagging the device as failing to participate in a power conservation state may permit and/or allow side-band monitoring of individual devices when an operating system and/or a processor of an information handling system may not be able, which may which allow and/or permit one or more power management policies to aid in reducing one or more system power consumptions. In one or more embodiments, the information that indicates that the device did not transition to the powered down state may be provided to another information handling system and/or to a user. For example, the information that indicates that the device did not transition to the powered down state may be utilized in debugging and/or in indicating an issue or a possible issue associated with the device. For instance, if the device did not transition to the powered down state, power may be dissipated.

In one or more embodiments, a developer and/or an administrator may utilize the information that indicates that the device did not transition to the powered down state. For example, the developer and/or the administrator may utilize the information that indicates that the device did not transition to the powered down state to debug what may be preventing an information handling system and/or a device from entering a sleep mode. For instance, the sleep mode may be or include a "modern standby" mode. In one or more embodiments, an issue or a possible issue associated with the device may include one or more of an issue with a device driver for the device, firmware of the device, a mechanical failure associated with the device, and an electrical issue and/or failure associated with the device, among others. In one example, a device driver (e.g., an operating system device driver, an information handling system firmware device driver, etc.) may not provide proper information to the device to have the device enter a sleep state. In a second example, firmware of the device may not properly receive and/or interpret information provided to the device to have the device enter a sleep state. In another example, firmware of the device may not be capable of properly having the device enter a sleep state.

In one or more embodiments, dissipating power, when the device should be in a state that does not dissipate or that dissipates little power, may cause an information handling system and/or the device to be non-compliant of one or more regulations and/or one or more ratings. In one example, the information handling system and/or the device may not be ENERGY STAR compliant. In another example, the information handling system and/or the device may not be compliant with one or more laws and/or one or more regulations of a jurisdiction. In one or more embodiments, by identifying one or more devices associated with an information handling system that did not transition to the powered down state or low power state, issues associated with the one or more devices may be addressed. For example, addressing the issues associated with the one or more devices may lead to power conservation. For instance, power conservation may lead to reduction in power utilization, which may lead to longer battery life and/or one or more environmental benefits, such as one or more reductions in pollution, among others.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a high definition audio (HDA) bus, a Peripheral Component Interconnect (PCI) bus, a PCI-Express (PCIe) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), a Mobile Industry Processor Interface (MIPI) bus, a serial advanced technology attachment (SATA) bus, and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCIe root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), SATA, a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, EC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

In one or more embodiments, processor 120 and one or more components of IHS 110 may be included in a system-on-chip (SoC). For example, the SoC may include processor 120 and a platform controller hub (not specifically illustrated).

Figure 2:
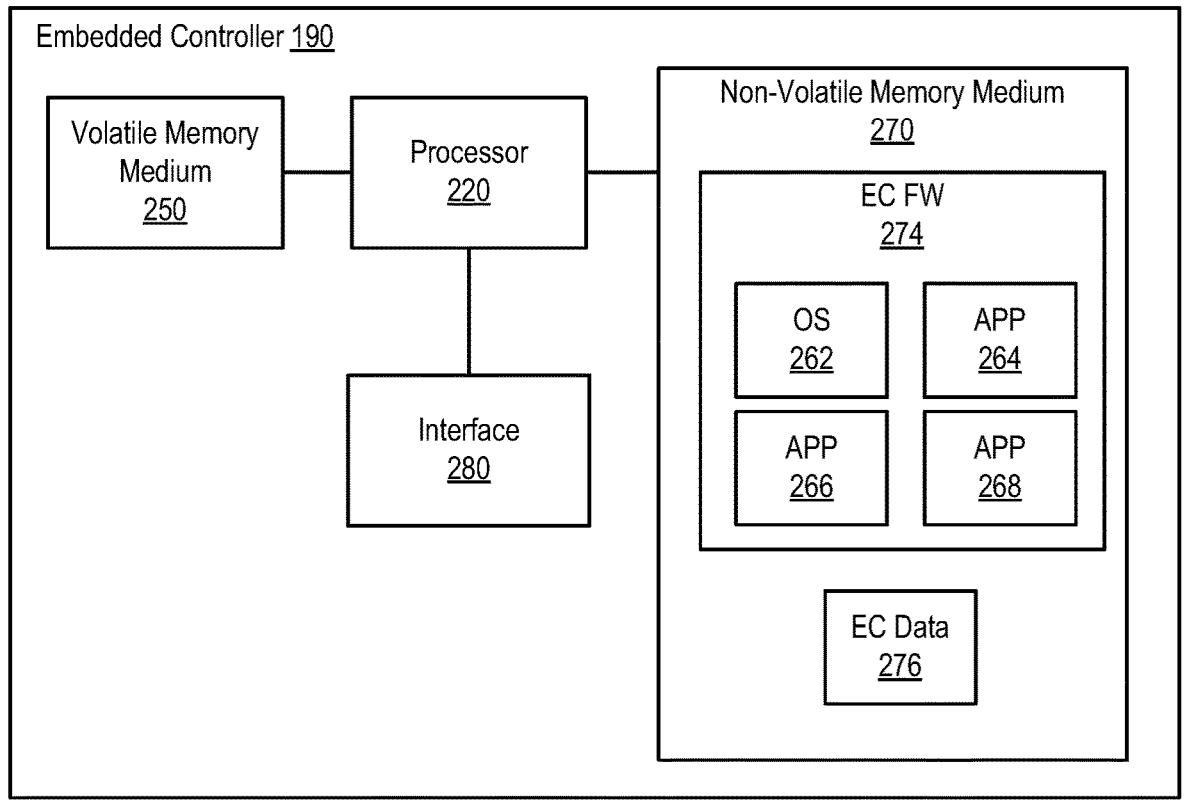
FIG. 2 illustrates an example embedded controller, according to one or more embodiments.

Turning now to FIG. 2, an example embedded controller is illustrated, according to one or more embodiments. As shown, EC 190 may include a processor 220, a volatile memory medium 250, a non-volatile memory medium 270, and an interface 280. As illustrated, non-volatile memory medium 274 may include an EC FW 274, which may include an OS 262 and APPs 264-268, and may include EC data 276. For example, OS 262 may be or include a real-time operating system (RTOS).

In one or more embodiments, interface 280 may include circuitry that enables communicatively coupling to one or more devices. In one example, interface 280 may include circuitry that enables communicatively coupling to one or more buses. In another example, interface 280 may include circuitry that enables one or more interrupt signals to be received. For instance, interface 280 may include general purpose input/output (GPIO) circuitry, and the GPIO circuitry may enable one or more interrupt signals to be received and/or provided via at least one interrupt line.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250.

In one or more embodiments, processor 220 may utilize EC data 276. In one example, processor 220 may utilize EC data 276 via non-volatile memory medium 270. In another example, one or more portions of EC data 276 may be transferred to volatile memory medium 250, and processor 220 may utilize EC data 276 via volatile memory medium 250.

Figure 3A:
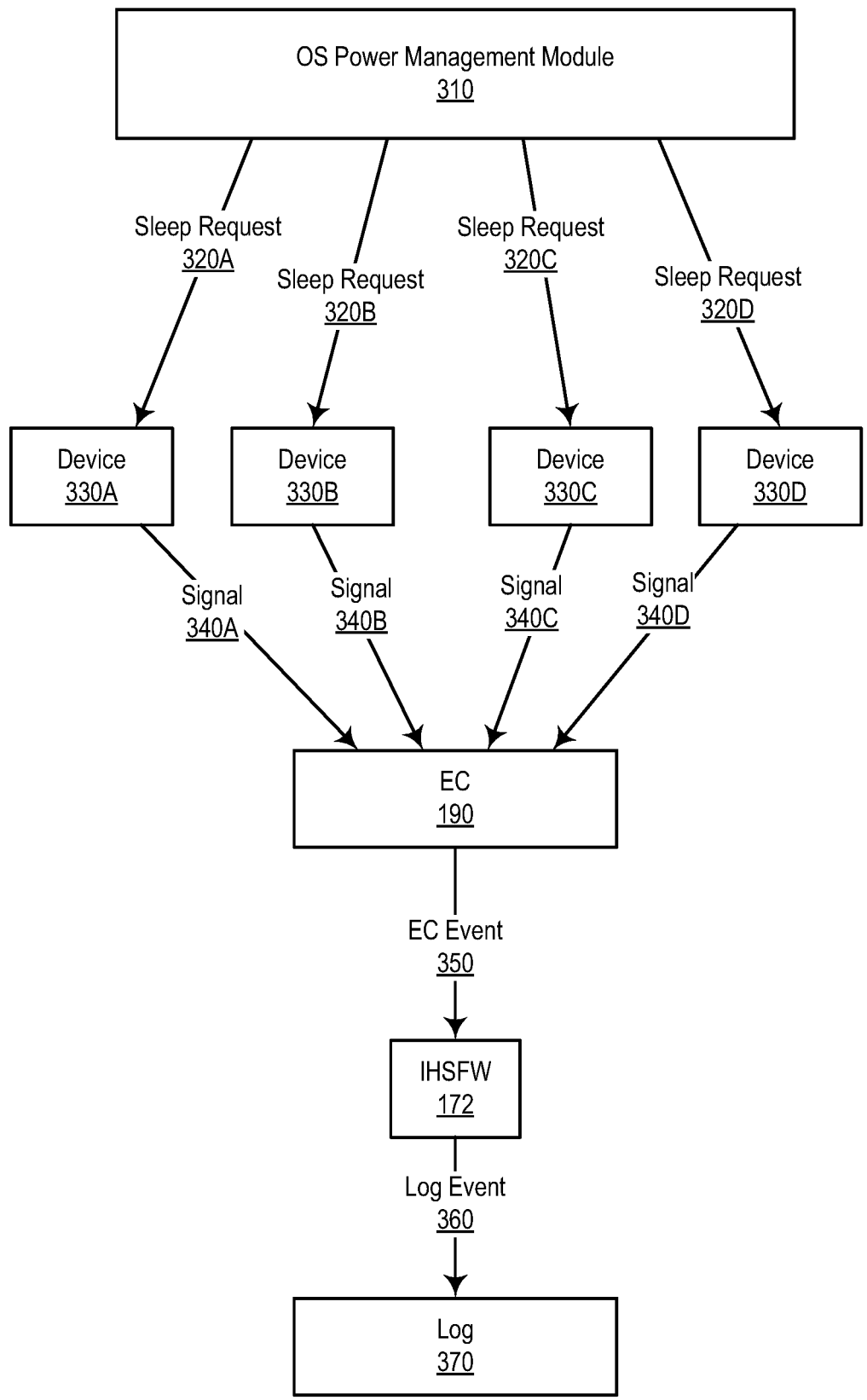
FIG. 3A illustrates an example block diagram of an operating system module providing requests to devices, according to one or more embodiments.

Turning now to FIG. 3A, an example block diagram of an operating system module providing requests to devices is illustrated, according to one or more embodiments. As shown, an OS power management module 310 may provide sleep requests 320A-320D to respective devices 330A-330D. For example OS 162 may include OS power management module 310. In one or more embodiments, sleep request 320 may include information indicating that device 330 should transition to a low power state. For example, the information indicating that device 330 should transition to the low power state may include an instruction indicating that device 330 should transition to the low power state. For instance, the low power state may be or include RTD3. In one or more embodiments, device 330 may be or include a device of IHS 110 or a device coupled to IHS 110. For example, device 330 may be or include a network interface (e.g., network interface 180), a memory medium (e.g., volatile memory medium 150, non-volatile memory medium 160, non-volatile memory medium 170, etc.), I/O subsystem 175, or an element of I/O subsystem 175, among others.

As illustrated, devices 330A-330D may provide respective signals 340A-340D to EC 190. In one example, device 330 may provide signal 340 to EC 190 via a bus. For instance, the bus may include one or more of a PCI bus, a PCIe bus, an I²C bus, a SPI bus, LPC bus, an eSPI bus, a USB, and a SMBus, among others. In a second example, device 330 may provide signal 340 to EC 190 via a PCIe coupling. In another example, device 330 may provide signal 340 to EC 190 via asserting or deasserting one or more GPIO lines. In one or more embodiments, signal 340 may indicate that device 330 is to transition to the low power state. As shown, EC 190 may provide an EC event 350 to IHSFW 172. In one or more embodiments, EC event 350 may include information that indicates that one or more of devices 330A-330D is to transition to the low power state. As illustrated, IHSFW 172 may provide a log event 360 to a log 370. In one or more embodiments, log 370 may be stored via a memory medium. In one example, log 370 may be stored via one or more of memory media 150, 160, and 170, among others. In a second example, log 370 may be stored via one or more external memory media. In another example, log 370 may be stored via one or more network storages and/or one or more other networked information handling systems 110.

Figure 3B:
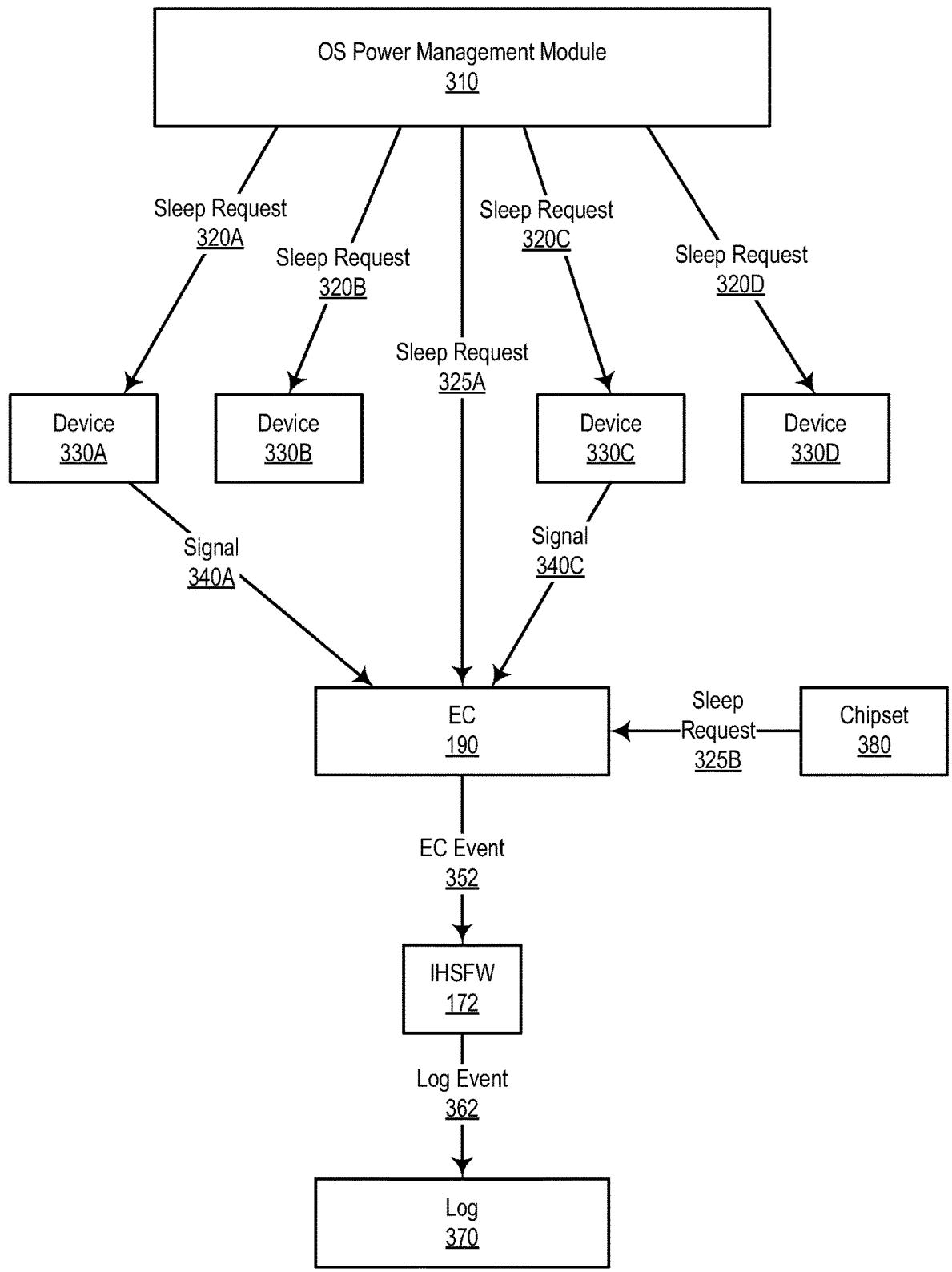
FIG. 3B illustrates an example block diagram of devices not complying with requests, according to one or more embodiments.

Turning now to FIG. 3B, an example block diagram of devices not complying with requests is illustrated, according to one or more embodiments. As shown, OS power management module 310 may provide sleep requests 320A-320D to respective devices 330A-330D. As illustrated, OS power management module 310 may provide a sleep request 325A to EC 190. As shown, a chipset 380 may provide a sleep request 325B to EC 190. In one or more embodiments, chipset 380 may be or include a chipset of IHS 110. As illustrated, devices 330A and 330C may provide respective signals 340A and 340C to EC 190. In one or more embodiments, EC 190 may provide an amount of time to receive signals 340 from respective devices 330. For example, if EC 190 does not receive signal 340 from device 330 within the amount of time, EC 190 may determine that device 330 is not to transition to the low power state. For instance, EC 190 may flag device 330 as failing to participate. In one or more embodiments, EC 190 may determine that device 330 is not to transition to the low power state based at least on sleep request 325. For example, if EC 190 does not receive signal 340 from device 330 after receiving sleep request 325 or after an amount of time transpiring after receiving sleep request 325, EC 190 may determine that device 330 is not to transition to the low power state. For instance, EC 190 may flag device 330 as failing to participate. As shown, EC 190 may not receive one or more signals from respective one or more devices 330B and 330D within the amount of time. In one example, EC 190 may determine that one or more devices 330B and 330D are not to transition to the low power state. In a second example, EC 190 may determine that status signals from respective one or more devices 330B and 330D were not received via a bus. For instance, the bus may include one or more of a PCI bus, a PCIe bus, an I²C bus, a SPI bus, LPC bus, an eSPI bus, a USB, and a SMBus, among others. In a third example, EC 190 may determine that status signals from respective one or more devices 330B and 330D were not received via a PCIe coupling. In another example, EC 190 may determine that status signals from respective one or more devices 330B and 330D were not received via asserting or deasserting one or more GPIO lines.

As illustrated, EC 190 may provide an EC event 352 to IHSFW 172. In one or more embodiments, EC event 352 may include information that indicates that one or more of devices 330A and 330C are to transition to the low power state and/or that one or more of devices 330B and 330D are not or will not to transition to the low power state. As shown, IHSFW 172 may provide a log event 362 to log 370. In one or more embodiments, log event 362 may include information that indicates that one or more of devices 330A and 330C are to transition to the low power state and/or that one or more of devices 330B and 330D are not or will not to transition to the low power state.

Figure 3C:
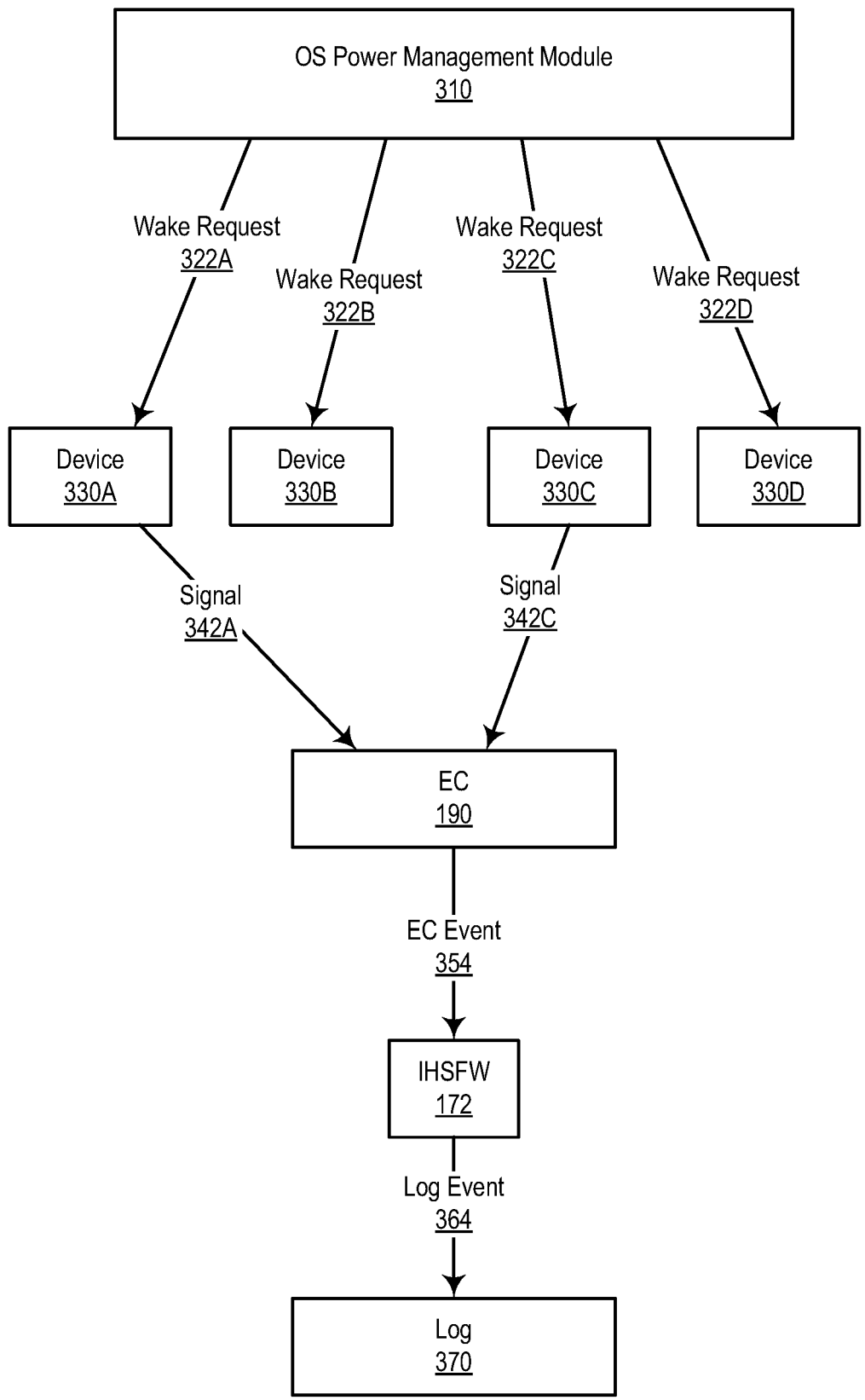
FIG. 3C illustrates another example block diagram of devices not complying with requests, according to one or more embodiments.

Turning now to FIG. 3C, another example block diagram of devices not complying with requests is illustrated, according to one or more embodiments. As shown, OS power management module 310 may provide wake requests 322A-322D to respective devices 330A-330D. As illustrated, devices 330A and 330C may provide respective signals 342A and 342C to EC 190. In one example, device 330 may provide signal 342 to EC 190 via a bus. For instance, the bus may include one or more of a PCI bus, a PCIe bus, an I²C bus, a SPI bus, LPC bus, an eSPI bus, a USB, and a SMBus, among others. In a second example, device 330 may provide signal 342 to EC 190 via a PCIe coupling. In another example, device 330 may provide signal 342 to EC 190 via asserting or deasserting one or more GPIO lines.

In one or more embodiments, EC 190 may provide an amount of time to receive signals 342 from respective devices 330. For example, if EC 190 does not receive signal 342 from device 330 within the amount of time, EC 190 may determine that device 330 is not to transition from the low power state. As shown, EC 190 may not receive one or more signals from respective one or more devices 330B and 330D within the amount of time. For example, EC 190 may determine that one or more devices 330B and 330D are not to transition from the low power state. For instance, EC 190 may flag device 330 as failing to participate. As illustrated, EC 190 may provide an EC event 354 to IHSFW 172. In one or more embodiments, EC event 354 may include information that indicates that one or more of devices 330A and 330C are to transition from the low power state and/or that one or more of devices 330B and 330D are not or will not transition from the low power state. As shown, IHSFW 172 may provide a log event 364 to log 370. In one or more embodiments, log event 364 may include information that indicates that one or more of devices 330A and 330C are to transition from the low power state and/or that one or more of devices 330B and 330D are not or will not from transition to the low power state.

Figure 4:
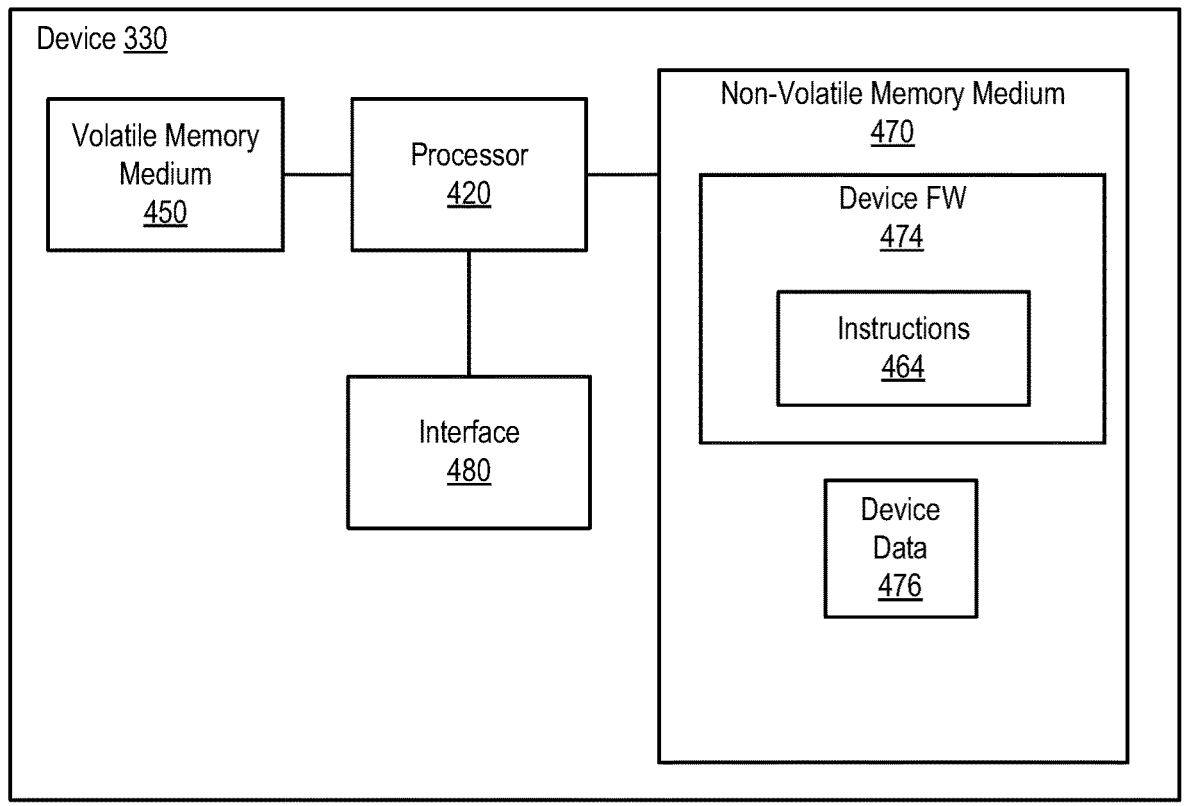
FIG. 4 illustrates an example device, according to one or more embodiments.

Turning now to FIG. 4, an example device is illustrated, according to one or more embodiments. As shown, device 330 may include a processor 420, a volatile memory medium 450, a non-volatile memory medium 470, and an interface 480. As illustrated, non-volatile memory medium 474 may include a device FW 474, which may include instructions 464, and may include device data 476. For example, instructions 464 may be executable by processor 420 in accordance with one or more flowcharts, systems, methods, and/or processes described herein. In one instance, processor 420 may execute processor instructions of instructions 464 via non-volatile memory medium 470. In another instance, one or more portions of instructions 464 may be transferred to volatile memory medium 450, and processor 420 may execute the one or more portions of the processor instructions 464 via volatile memory medium 450.

In one or more embodiments, interface 480 may include circuitry that enables communicatively coupling to one or more other devices. In one example, interface 480 may include circuitry that enables communicatively coupling to one or more buses. In another example, interface 480 may include circuitry that enables one or more interrupt signals to be received and/or transmitted. For instance, interface 480 may include GPIO circuitry, and the GPIO circuitry may enable one or more interrupt signals to be received and/or transmitted via at least one interrupt line. In one or more embodiments, processor 420 may utilize device data 476. In one example, processor 420 may utilize device data 476 via non-volatile memory medium 470. In another example, one or more portions of device data 476 may be transferred to volatile memory medium 450, and processor 420 may utilize device data 476 via volatile memory medium 450.

Figure 5:
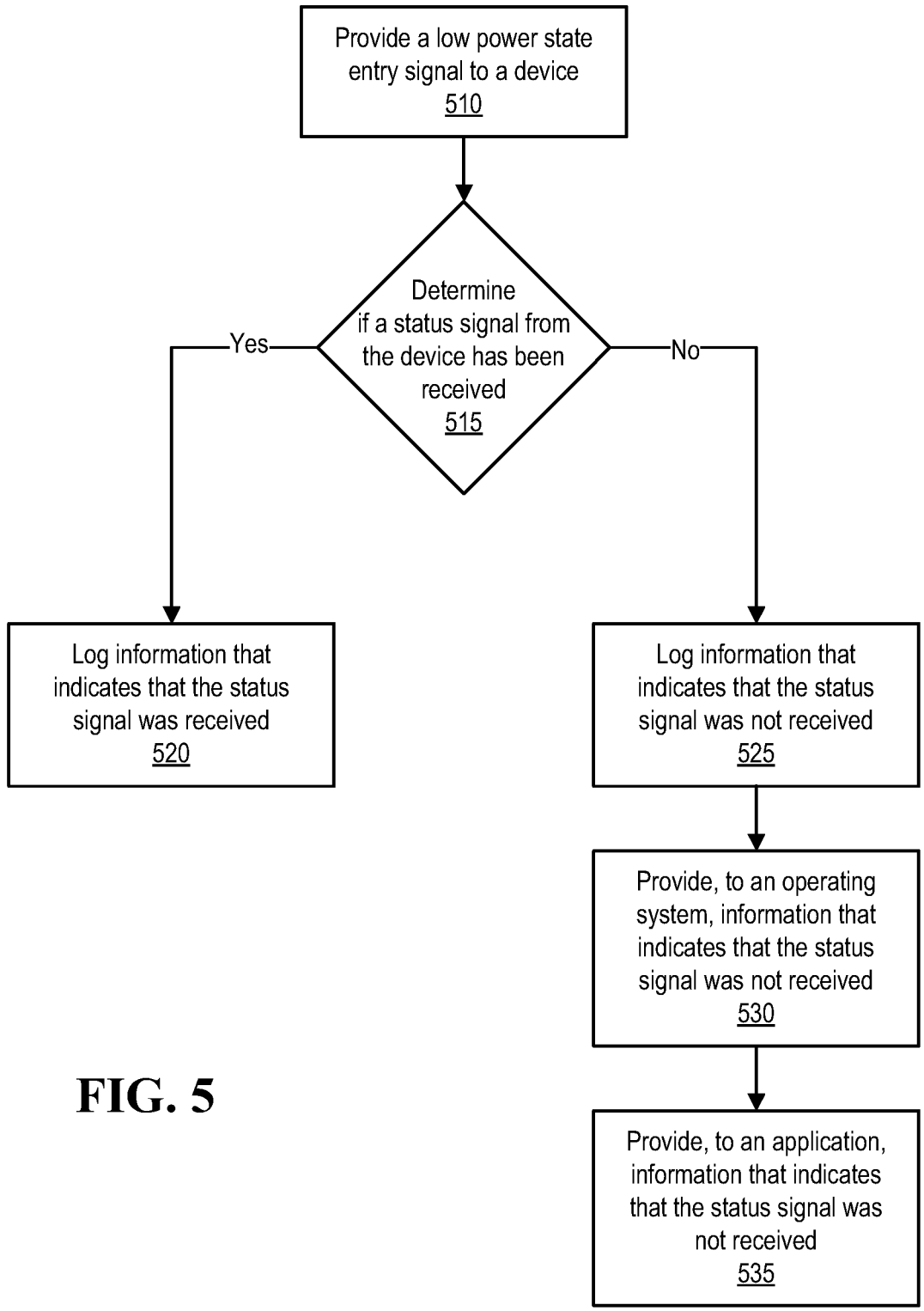
FIG. 5 illustrates an example of a method of operating an information handling system, according to one or more embodiments.

Turning now to FIG. 5, an example of a method of operating an information handling system is illustrated, according to one or more embodiments. At 510, a low power state entry signal may be provided to a device. For example, OS power management module 310 may provide a low power state entry signal to device 330. For instance, the low power state entry signal may be or include sleep request 320. In one or more embodiments, OS power management module 310 may provide a low power state entry signal to multiple of devices 330A-330D, among others. For example, low power state entry signals may be provided to multiple devices, at 510. For instance, the low power state entry signals may indicate device transitions to low power states. In one or more embodiments, one or more low power state entry signals may be or include respective one or more RTD3 entry signals.

At 515, it may be determined if a status signal from the device has been received. For example, EC 190 may determine if a status signal from device 330 has been received. In one or more embodiments, determining if a status signal from the device has been received may include determining if a status signal from the device has been received within an amount of time. For example, EC 190 may determine if the amount of time has expired. For instance, if the amount of time has expired and a status signal from the device has not been received, then it may be determined that a status signal from the device has not been received.

In one or more embodiments, OS power management module 310 may provide a message to EC 190 that indicates that a low power state entry signal has been provided to device 330. For example, EC 190 may start a timer after receiving the message from OS power management module 310. In one instance, if a status signal (e.g., signal 340) from device 330 has been received within an amount of time, based at least on the starting the timer, EC 190 may determine that a status signal from device 330 has been received, which indicates that device 330 is to enter or has entered the low power state (e.g., RTD3, a lowest power consumption state, etc.). In another instance, if a status signal from device 330 has not been received within an amount of time, based at least on the starting the timer, EC 190 may determine that a status signal from device 330 has not been received, which may indicate that device 330 has not entered or will not to enter the low power state (e.g., RTD3, a lowest power consumption state, etc.).

If the status signal from the device has been received, information that indicates that the status signal has been received may be logged, at 520. For example, EC 190 may log information that indicates that the status signal has been received. In one or more embodiments, EC 190 logging the information that indicates that the status signal has been received may include providing EC event 350 to IHSFW 172. For example, IHSFW 172 may provide log event 360 to log 370. In one instance, log 370 may include a memory medium that stores the information that indicates that the status signal has been received. In another instance, log 370 may include instructions that receives log event 360 and/or stores the information that indicates that the status signal has been received via a memory medium.

If the status signal from the device has not been received, information that indicates that the status signal has been received may be logged, at 525. For example, EC 190 may log information that indicates that the status signal has not been received. In one or more embodiments, EC 190 logging the information that indicates that the status signal has not been received may include providing EC event 352 to IHSFW 172. For example, IHSFW 172 may provide log event 362 to log 370. In one instance, log 370 may include a memory medium that stores the information that indicates that the status signal has not been received. In another instance, log 370 may include instructions that receives log event 362 and/or stores the information that indicates that the status signal has been not received via a memory medium. In one or more embodiments, logging the information that indicates that the status signal has not been received from device 330 may include flagging device 330 as a failing participant.

At 530, information that indicates that the status signal has not been received may be provided to an operating system. For example, EC 190 may provide information, that indicates that the status signal has not been received, to OS 162. In one instance, EC 190 may provide the information to OS 162 via at least one of a WMI and a CIM, among others. In another instance, IHSFW 172 may provide a message to OS 162 that indicates that the device did not comply with the low power state entry signal via at least one of a WMI and a CIM, among others. In one or more embodiments, providing, to OS 162, information that indicates that the status signal has not been received may include providing the information, that indicates that the status signal has not been received, to IHSFW 172. For example, IHSFW 172 may provide the information that indicates that the status signal has not been received via at least one of a WMI and a CIM, among others.

At 535, information that indicates that the status signal has not been received may be provided to an application. For example, information that indicates that the status signal has not been received may be provided to an APP of APPs 164-168. For instance, the application may be or include a debugging and/or logging application that may provide the information that indicates that the status signal has not been received to a user (e.g., a developer, an administrator, etc.). In one or more embodiments, the application may access log 370. For example, accessing log 370 may include accessing and/or retrieving data from a memory medium that stores the information that indicates that the status signal has not been received. In one or more embodiments, the method or one or more portions of the method described with reference to FIG. 5 may be repeated. For example, the method or one or more portions of the method described with reference to FIG. 5 may be repeated for multiple devices 330A-330D.

Figure 6:
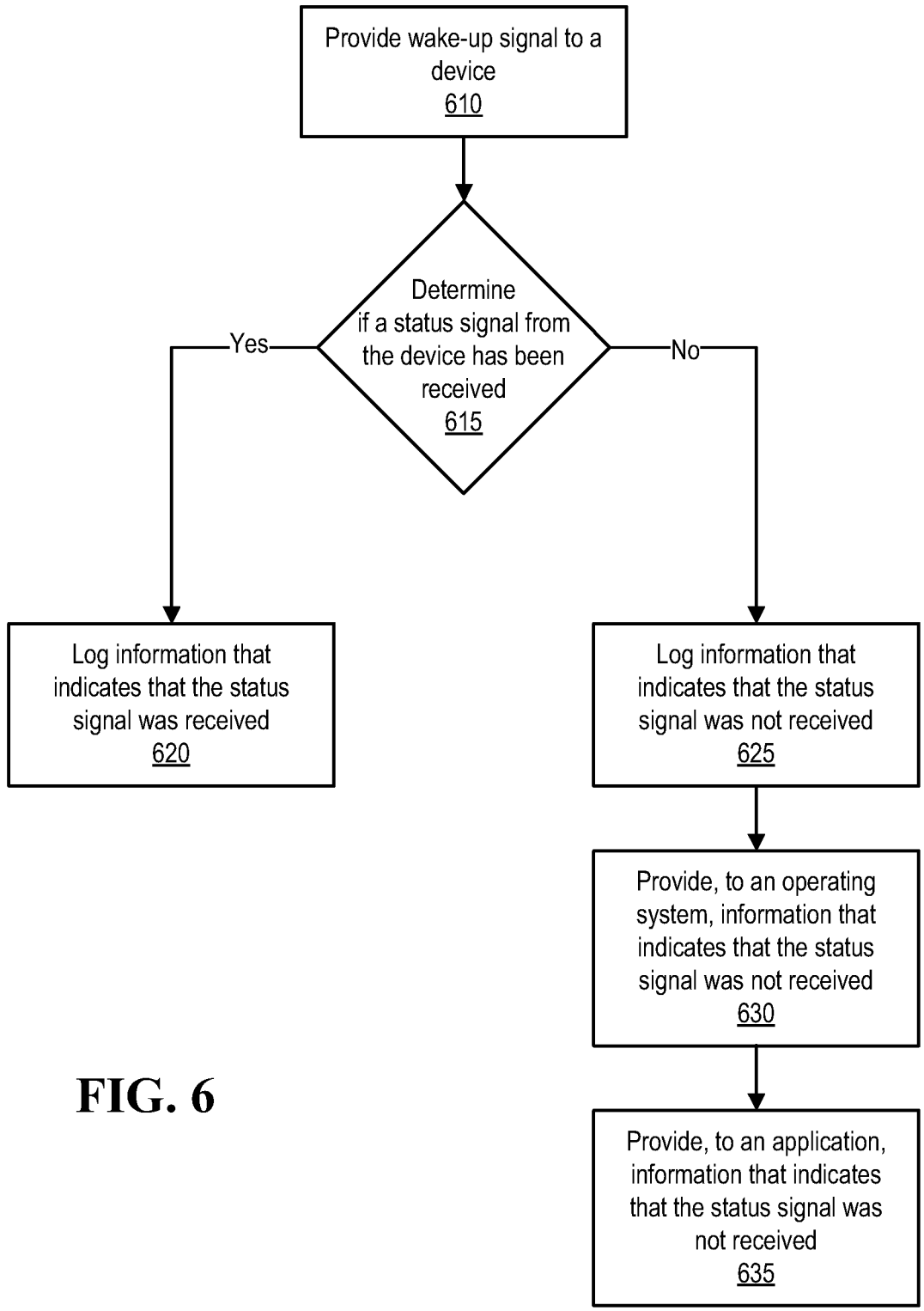
FIG. 6 illustrates an example of another method of operating an information handling system, according to one or more embodiments.

Turning now to FIG. 6, an example of another method of operating an information handling system is illustrated, according to one or more embodiments. At 610, a wake-up signal may be provided to a device. For example, OS power management module 310 may provide a wake-up signal to device 330. For instance, the wake-up signal may be or include wake request 322. In one or more embodiments, OS power management module 310 may provide a wake-up signal to multiple of devices 330A-330D, among others. For example, wake-up signals may be provided to multiple devices, at 610.

At 615, it may be determined if a status signal from the device has been received. For example, EC 190 may determine if a status signal from device 330 has been received. In one or more embodiments, determining if a status signal from the device has been received may include determining if a status signal from the device has been received within an amount of time. For example, EC 190 may determine if the amount of time has expired. For instance, if the amount of time has expired and a status signal from the device has not been received, then it may be determined that a status signal from the device has not been received.

In one or more embodiments, OS power management module 310 may provide a message to EC 190 that indicates that a wake-up signal has been provided to device 330. For example, EC 190 may start a timer after receiving the message from OS power management module 310. In one instance, if a status signal (e.g., signal 342) from device 330 has been received within an amount of time, based at least on the starting the timer, EC 190 may determine that a status signal from device 330 has been received, which indicates that device 330 is to enter or return to an operational power state (e.g., DO). In another instance, if a status signal from device 330 has not been received within an amount of time, based at least on the starting the timer, EC 190 may determine that a status signal from device 330 has not been received, which may indicate that device 330 has not entered or will not to enter the operational power state (e.g., DO).

If the status signal from the device has been received, information that indicates that the status signal has been received may be logged, at 620. For example, EC 190 may log information that indicates that the status signal has been received. In one or more embodiments, EC 190 logging the information that indicates that the status signal has been received may include providing EC event 354 to IHSFW 172. For example, IHSFW 172 may provide log event 364 to log 370. In one instance, log 370 may include a memory medium that stores the information that indicates that the status signal has been received. In another instance, log 370 may include instructions that receives log event 360 and/or stores the information that indicates that the status signal has been received via a memory medium.

If the status signal from the device has not been received, information that indicates that the status signal has been received may be logged, at 625. For example, EC 190 may log information that indicates that the status signal has not been received. In one or more embodiments, EC 190 logging the information that indicates that the status signal has not been received may include providing EC event 354 to IHSFW 172. For example, IHSFW 172 may provide log event 364 to log 370. In one instance, log 370 may include a memory medium that stores the information that indicates that the status signal has not been received. In another instance, log 370 may include instructions that receives log event 364 and/or stores the information that indicates that the status signal has been not received via a memory medium. In one or more embodiments, logging the information that indicates that the status signal has not been received from device 330 may include flagging device 330 as a failing participant.

At 630, information that indicates that the status signal has not been received may be provided to an operating system. For example, EC 190 may provide information, that indicates that the status signal has not been received, to OS 162. In one instance, EC 190 may provide the information to OS 162 via at least one of a WMI and a CIM, among others. In another instance, EC 190 may provide a message to OS 162 that indicates that the device did not comply with the wake-up signal via at least one of a WMI and a CIM, among others. In one or more embodiments, providing, to OS 162, information that indicates that the status signal has not been received may include providing the information, that indicates that the status signal has not been received, to IHSFW 172. For example, IHSFW 172 may provide the information that indicates that the status signal has not been received via at least one of a WMI and a CIM, among others.

At 635, information that indicates that the status signal has not been received may be provided to an application. For example, information that indicates that the status signal has not been received may be provided to an APP of APPs 164-168. For instance, the application may be or include a debugging and/or logging application that may provide the information that indicates that the status signal has not been received to a user (e.g., a developer, an administrator, etc.). In one or more embodiments, the application may access log 370. For example, accessing log 370 may include accessing and/or retrieving data from a memory medium that stores the information that indicates that the status signal has not been received. In one or more embodiments, the method or one or more portions of the method described with reference to FIG. 6 may be repeated. For example, the method or one or more portions of the method described with reference to FIG. 6 may be repeated for multiple devices 330A-330D.

Figure 7:
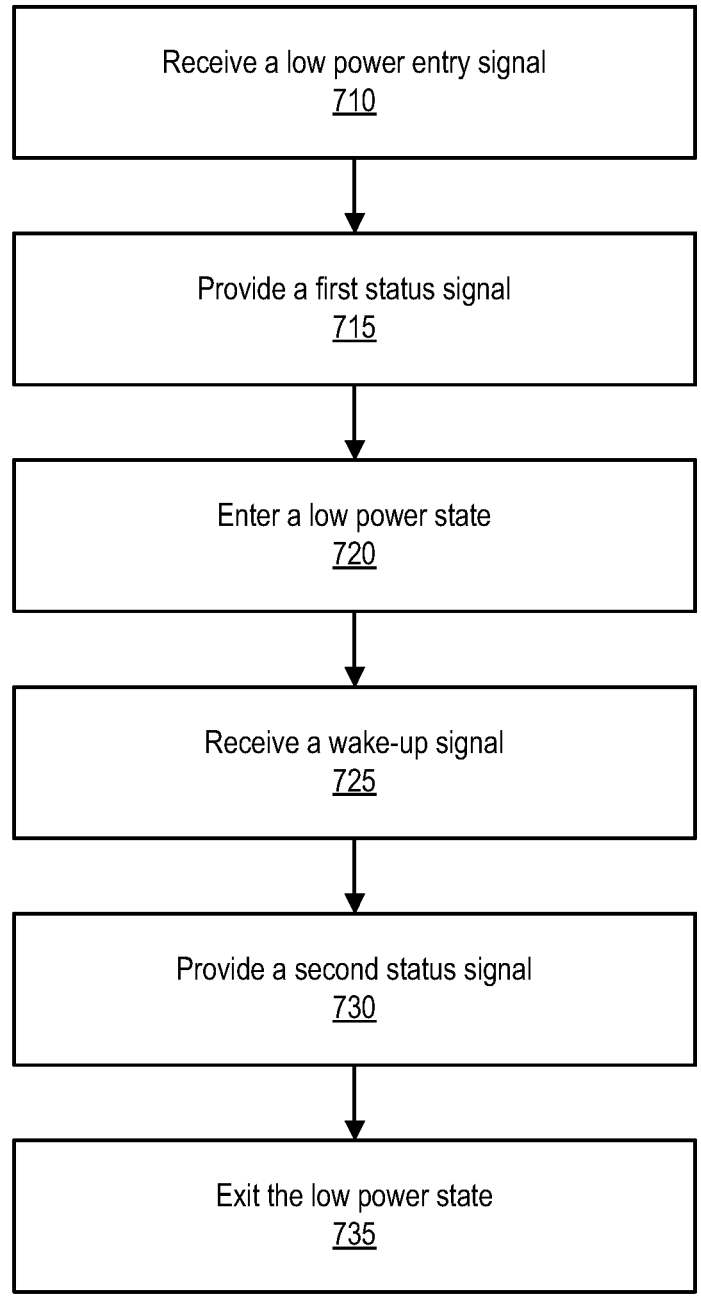
FIG. 7 illustrates an example of a method of operating a device, according to one or more embodiments.

Turning to FIG. 7, an example of a method of operating a device is illustrated, according to one or more embodiments. At 710, a device may receive a low power state entry signal. For example, device 330 may receive a low power state entry signal, indicating a first device state transition to a low power state. For instance, device 330 may receive a low power state entry signal from OS 162 and/or OS power management module 310. In one or more embodiments, a low power state entry signal may be or include a RTD3 entry signal. At 715, the device may provide a first status signal within an amount of time. For example, device 330 may provide a first status signal via interface 480 within an amount of time. For instance, device 330 may provide the first status signal to EC 190. In one or more embodiments, providing the first status signal within the amount of time may be performed in response to receiving the low power state entry signal. For example, providing the first status signal within the amount of time may be performed in response to receiving a RTD3 entry signal.

At 720, the device may enter a low power state. For example, device 330 may enter a low power state. In one instance, device 330 may enter a sleep state. In another instance, device 330 may enter RTD3. At 725, the device may receive a wake-up signal. For example, device 330 may receive a wake-up state entry signal, indicating a second device state transition to an operating state. For instance, device 330 may receive a wake-up signal (e.g., wake request 322) from OS 162 and/or OS power management module 310. At 730, the device may provide a second status signal within another amount of time. For example, device 330 may provide a second status signal via interface 480 within another amount of time. For instance, device 330 may provide the second status signal to EC 190. In one or more embodiments, providing the second status signal within the other amount of time may be performed in response to receiving the wake-up signal. At 735, the device may exit the low power state. For example, device 330 may exit the low power state. In one instance, device 330 may enter a running state. In another instance, device 330 may enter D0.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory medium, coupled to the at least one processor, that stores an operating system, executable by the at least one processor; and
   an embedded controller;
   wherein, when the at least one processor executes the operating system, the information handling system is caused to:
      provide low power state entry signals, indicating device state transitions to low power states, to a plurality of devices of the information handling system and to the embedded controller;
   wherein the embedded controller is configured to:
      after the operating system provides the low power state entry signals to the plurality of devices and to the embedded controller, receive a low power state entry signal of the low power state entry signals;
      receive a first status signal from a first device of the plurality of devices within an amount of time transpiring after the embedded controller receives the low power state entry signal;
      determine that the first status signal from the first device was received within the amount of time;
      determine that a second status signal from a second device of the plurality of devices was not received within the amount of time;
      log that the first status signal from the first device was received within the amount of time; and
      log that the second status signal from the second device was not received within the amount of time.

2. The information handling system of claim 1, wherein the embedded controller is further configured to provide a message that indicates that the second device did not comply with the low power state entry signal.

3. The information handling system of claim 2, wherein to provide the message, the embedded controller is further configured to provide the message to the operating system.

4. The information handling system of claim 3, wherein the memory medium further includes instructions that implement at least one of a Windows Management Interface (WMI) and a Common Information Model (CIM), which when executed by the at least one processor, further cause the information handling system to receive the message via the at least one of the WMI and the CIM.

5. The information handling system of claim 4,
   wherein the memory medium further stores an application, executable by the at least one processor;
   wherein, when the at least one processor executes the operating system, the information handling system is further caused to:
      provide the message to the application; and
   wherein, when the at least one processor executes the application, the information handling system is caused to:
      provide the message to at least one of a user and a storage device.

6. The information handling system of claim 1, wherein, when the embedded controller determines that the second status signal from the second device was not received within the amount of time, the embedded controller is further configured to determine that the second status signal from the second device was not received via at least one of a Peripheral Component Interconnect (PCI) bus, a PCI-Express (PCIe) bus, an inter-integrated circuit (I²C) bus, a serial peripheral interface (SPI) bus, a low pin count (LPC)

bus, an enhanced serial peripheral interface (eSPI) bus, a universal serial bus (USB), a system management bus (SMBus), and a PCIe coupling.

7. The information handling system of claim 1,
wherein, when the embedded controller logs that the second status signal from the second device was not received within the amount of time, the embedded controller is further configured to store, via the memory medium, information associated with not receiving the second status signal from the second device within the amount of time; and
wherein the memory medium further includes instructions, which when executed by the at least one processor, cause the information handling system to further:
access the memory medium; and
provide the information associated with not receiving the second status signal from the second device within the amount of time.

8. The information handling system of claim 1,
wherein, when the at least one processor executes the operating system, the information handling system is further caused to:
provide a wake-up signal to the plurality of devices of the information handling system; and
wherein the embedded controller is further configured to:
after the operating system provides the wake-up signals to the plurality of devices, determine that a third status signal from a third device of the plurality of devices was not received within another amount of time; and
log that the third status signal from the third device was not received within the other amount of time.

9. A method of operating an information handling system, comprising:
an operating system, executing on an information handling system, providing low power state entry signals, indicating device state transitions to low power states, to a plurality of devices of the information handling system and to an embedded controller;
after the operating system providing the low power state entry signal to the plurality of devices and to the embedded controller, the embedded controller receiving a low power state entry signal of the low power state entry signals;
receiving a first status signal from a first device of the plurality of devices within an amount of time transpiring after the embedded controller receives the low power state entry signal;
the embedded controller determining that the first status signal from the first device was received within the amount of time;
the embedded controller determining that a second status signal from a second device of the plurality of devices was not received within the amount of time;
the embedded controller logging that the first status signal from the first device was received within the amount of time; and
the embedded controller logging that the second status signal from the second device was not received within the amount of time.

10. The method of claim 9, further comprising:
the embedded controller providing a message that indicates that the second device did not comply with the low power state entry signal.

11. The method of claim 10, wherein the providing the message includes the embedded controller providing the message to the operating system.

12. The method of claim 11, wherein the embedded controller providing the message to the operating system includes the embedded controller providing the message to the operating system via at least one of a Windows Management Interface (WMI) and a Common Information Model (CIM).

13. The method of claim 12, further comprising:
the operating system providing the message to an application; and
the application providing the message to at least one of a user and a storage device.

14. The method of claim 9, wherein the embedded controller determining that the second status signal from the second device was not received within the amount of time includes the embedded controller determining that the second status signal from the second device was not received via at least one of a Peripheral Component Interconnect (PCI) bus, a PCI-Express (PCIe) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a PCIe coupling.

15. The method of claim 9, wherein the embedded controller logging that the second status signal from the second device was not received within the amount of time includes storing, via a memory medium, information associated with not receiving the second status signal from the second device within the amount of time;
the method further comprising:
accessing the memory medium; and
providing the information associated with not receiving the second status signal from the second device within the amount of time.

16. The method of claim 9, further comprising:
the operating system, executing on the information handling system, providing wake-up signals to the plurality of devices of the information handling system;
after the operating system provides the wake-up signals to the plurality of devices, the embedded controller determining that a third status signal from a third device of the plurality of devices was not received within another amount of time; and
the embedded controller logging that the third status signal from the third device was not received within the other amount of time.

17. A device that is utilizable with an information handling system, comprising:
a processor;
a memory medium coupled to the processor; and
an interface coupled to the processor and operable to communicate with an embedded controller of the information handling system;
wherein the memory medium stores instructions, which when executed by the processor, cause the device to:
receive a low power state entry signal indicating a first state device transition to a low power state, the low power state entry signal received from an operating system executing on the information handling system;
in response to receiving the low power state entry signal from the operating system, assert a general purpose input/output (GPIO) line to provide a first status signal via the interface within an amount of time;
enter the low power state;

receive a wake-up signal indicating a second device transition to an operating state, the wake-up signal received from the operating system;

in response to receiving the wake-up signal from the operating system, provide a second status signal via the interface within the amount of time; and exit the low power state.

18. The device of claim 17, wherein, to provide the first status signal via the interface within the amount of time, the instructions, which when executed by the processor, further cause the device to provide the first status signal via the interface within the amount of time, the instructions via at least one of a Peripheral Component Interconnect (PCI) bus, a PCI-Express (PCIe) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a PCI Express (PCIe) coupling.

19. The device of claim 17, wherein the device is a slave device on a bus and asserts the GPIO line to alert a master of the bus that the device has information, via the bus, for the master.

* * * * *